(12) United States Patent
Su

(10) Patent No.: US 8,672,282 B2
(45) Date of Patent: Mar. 18, 2014

(54) FIXING STRUCTURE FOR ELECTRONIC DEVICE WITH DISPLAY SCREEN

(76) Inventor: Yuanzhi Su, Jiangmen (CN)

( * ) Notice: Subject to any disclaimer, the term of this patent is extended or adjusted under 35 U.S.C. 154(b) by 77 days.

(21) Appl. No.: 13/343,326

(22) Filed: Jan. 4, 2012

(65) Prior Publication Data

US 2013/0119220 A1    May 16, 2013

(30) Foreign Application Priority Data

Nov. 16, 2011 (CN) .......................... 2011 1 0363051
Nov. 16, 2011 (CN) ...................... 2011 2 0453967 U

(51) Int. Cl.
| | |
|---|---|
| *A47B 91/00* | (2006.01) |
| *A47G 29/00* | (2006.01) |
| *B65D 19/00* | (2006.01) |
| *A47F 5/00* | (2006.01) |
| *A47F 7/00* | (2006.01) |
| *F16M 11/00* | (2006.01) |
| *F16M 13/00* | (2006.01) |
| *F16M 11/20* | (2006.01) |
| *E04G 3/00* | (2006.01) |

(52) U.S. Cl.
USPC ................ 248/346.03; 248/122.1; 248/188.1; 248/274.1; 248/371

(58) Field of Classification Search
USPC .............. 248/688, 371, 176.1, 176.3, 229.14, 248/229.24, 231.21, 231.61; 361/679.01, 361/679.02, 679.09, 679.21, 679.22, 361/679.55–679.56, 679.29, 679.41
See application file for complete search history.

(56) References Cited

U.S. PATENT DOCUMENTS

| | | | | |
|---|---|---|---|---|
| 7,198,240 | B2 * | 4/2007 | Chen ........................... | 248/284.1 |
| 7,628,365 | B2 * | 12/2009 | Lee .............................. | 248/297.21 |
| 2009/0166502 | A1 * | 7/2009 | Wang et al. .................... | 248/423 |
| 2010/0171006 | A1 * | 7/2010 | Chen et al. .................. | 248/122.1 |

* cited by examiner

*Primary Examiner* — Jonathan Liu
*Assistant Examiner* — Taylor Morris
(74) *Attorney, Agent, or Firm* — R. Neil Sudol; Henry D. Coleman

(57) ABSTRACT

A fixing structure for electronic device with a display screen, which comprises a base, a supporting plate interposed into the base, a fixing plate connected with the supporting plate via a damping shaft, vertically moveable jaws for locking the supporting plate, and a slide block for pushing the jaws to release the supporting plate. The jaws are arranged in an upper jaw and a lower jaw, whatever the direction the supporting plate are interposed in the base in, there is always one of the upper and lower jaws able to lock the supporting plate.

8 Claims, 5 Drawing Sheets

FIXING STRUCTURE FOR ELECTRONIC DEVICE WITH DISPLAY SCREEN

TECHNICAL FIELD

The present invention relates to an electronics accessory, and more particularly to a fixing structure for electronic device with display screen.

BACKGROUND INFORMATION

At present new consumer electronic products have had a rapid growth, bringing great conveniences for people in the fields of life, work and etc., furthermore the current electronic products are being developed towards multifunctional integration, adaption to various service conditions, and comfortable experience, such as tablet computer, mobile phone, GPS navigator, and portable DVD and media player. These products can be used in office, bedroom, car and etc., such a product usually comprises a display screen and has a mounting bracket on the backside thereof, so that user can unfold the mounting basket to support the electronic product on the table for the purpose of watching video or other like uses. However at present the mounting basket used for these electronic products is fixed at a specified angle, which cannot be changed arbitrarily, and the user experience is thus impaired. In addition, the mounting brackets of these electronic products only have single function, usually only for the products of a specified model, and for a static occasion. When fixing the electronics in, for example, a moving car, usually extra fixing and adjusting apparatuses are required, resulting in a complicated and larger system, and degraded aesthetics.

There is a new fixing bracket for electronics with display screen in the market, which achieves multi-angle supporting, facilitates users to fix the electronics at different angles and positions, and thus have a relatively human design. However, the fixing bracket still has some shortcomings, including: the basket comprises several marbles, springs, levers and bosses arranged on a supporting plate longitudinally, a corresponding fixing groove is provided in a socket for the supporting plate, and the fixing bracket is locked by the marbles, and released by the springs, its internal structure is complicated, its processing and assembling are difficult, in addition, as the supporting plate does not have a front-back symmetrical structure, only the insertion with a right orientation is allowed, the applicability and user experience are thus impaired significantly.

SUMMARY OF THE INVENTION

In order to overcome the shortcomings of the existing fixing structure for electronics with display screen, such as processing and assembling are difficult, structure is complicated, only single insertion is allowed, the present invention provides an improved fixing structure for electronic products.

The technical solution adopted by the present invention to solve the technical problem could be described as:

A fixing structure for electronic device with display screen, comprising a base, a supporting plate interposed into the base, a fixing plate connected with the supporting plate via a damping shaft, the base comprising vertically movable jaws in the interior thereof, each which is provided with bosses for locking the supporting plate, the supporting plate being provided with grooves corresponding to the bosses, the fixing structure further comprising a slide block for pushing the bosses out of the grooves.

Furthermore, the base further comprises an upper cover, and a lower cover, coupled to form a cavity for accommodating the supporting plate.

In order to ensure the supporting plate can be clamped regardless of the inserted direction, the jaws include a upper one and a lower one, respectively mounted on the upper cover and the lower cover, correspondingly and the upper cover and the lower cover are provided with vertical shafts for mounting and positioning the jaws.

The supporting plate comprises a baseplate with the grooves, and a cover plate coupled to the baseplate, the slide block is disposed in and sliding among the baseplate.

In order to successfully push the bosses to move out the groove, each boss is provided with a two-way inclined plane on the top thereof, the slide block is provided with inclined steps, of which inclined planes are oriented towards bosses.

In order to ensure the slide block can slide back to the original position, an elastic element is mounted between the slide block and the supporting plate.

In order to make the structure more compact, the slide block is provided with a hollow groove in which the elastic element is mounted, of which one end is connected with the slide block, another end is connected with a projection on the supporting plate.

Furthermore, the slide block is further provided with a lever on the end thereof, correspondingly the supporting plate is provided with an opening, the lever is movable within the opening.

Furthermore, the damping shaft is a piecewise damping shaft.

Furthermore, the fixing structure further comprises a communication port on the supporting plate for allowing the electronic device fixed to communicate with other devices, and a power port on the lower cover for connecting the electronic device fixed to an external power source.

The beneficial effects of the present invention could include: simple and compact structure, easy assembly, reduced manufacturing cost, and expanded service lifetime. In addition, the apparatus comprising two jaws (upper and lower) ensures that there is always one jaw locking the supporting plate whatever the side (front or back) the supporting plate is interposed with, the usability, aesthetics and adaptability of the product are thus improved.

BRIEF DESCRIPTION OF THE DRAWINGS

The present invention will be further described using embodiments in conjunction with the accompanying drawings. In the drawings.

EMBODIMENTS

Figure 1:
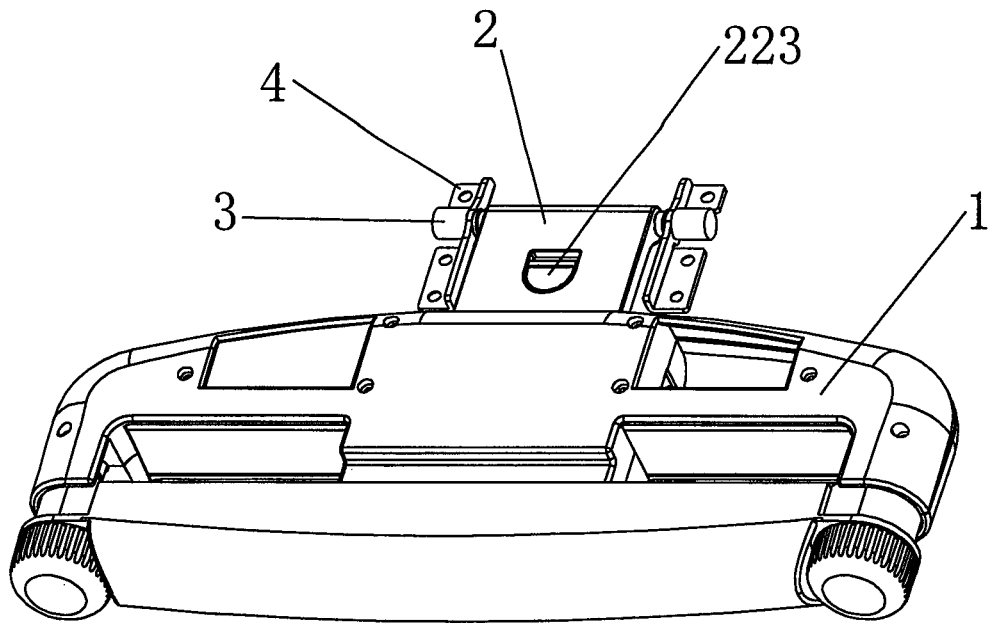
FIG. 1 is a solid schematic view the present invention.
Figure 2:
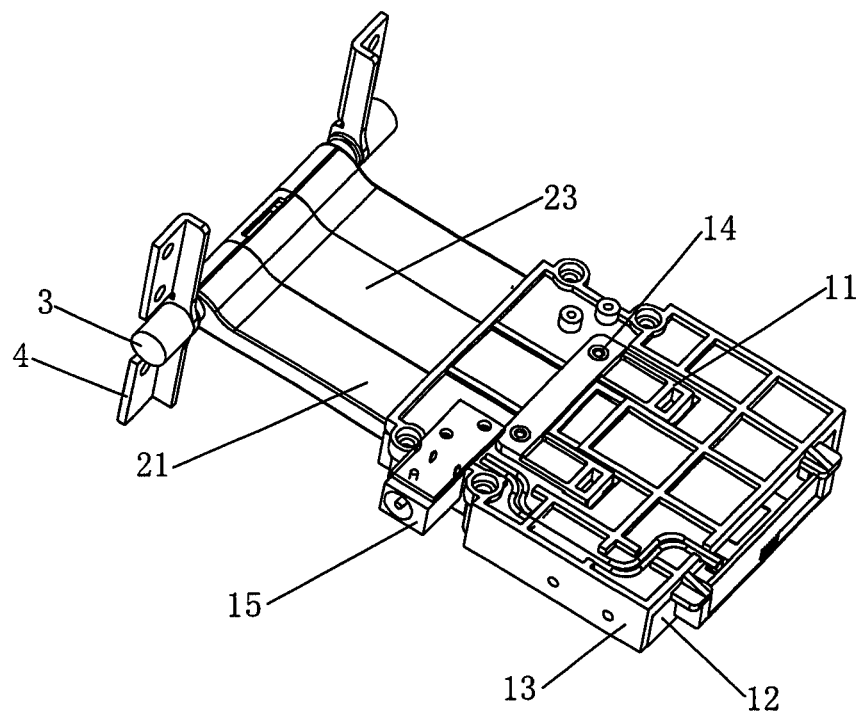
FIG. 2 is a sold schematic view of the insertion structure of the present invention.
Figure 3:
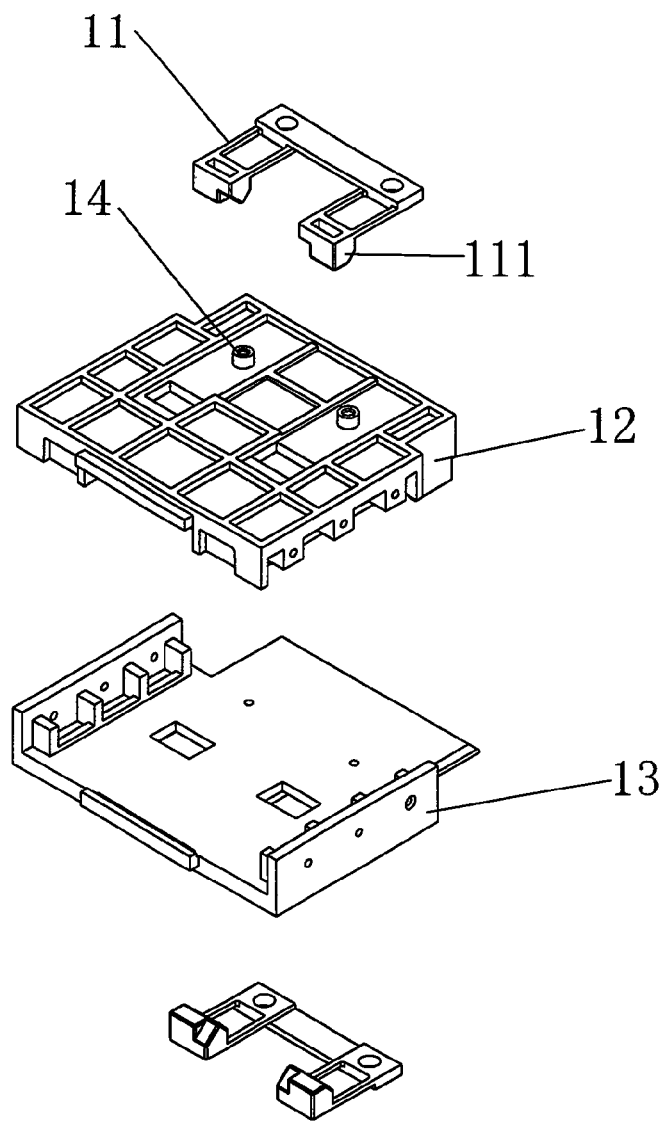
FIG. 3 is an exploded view of the base of the present invention.
Figure 4:
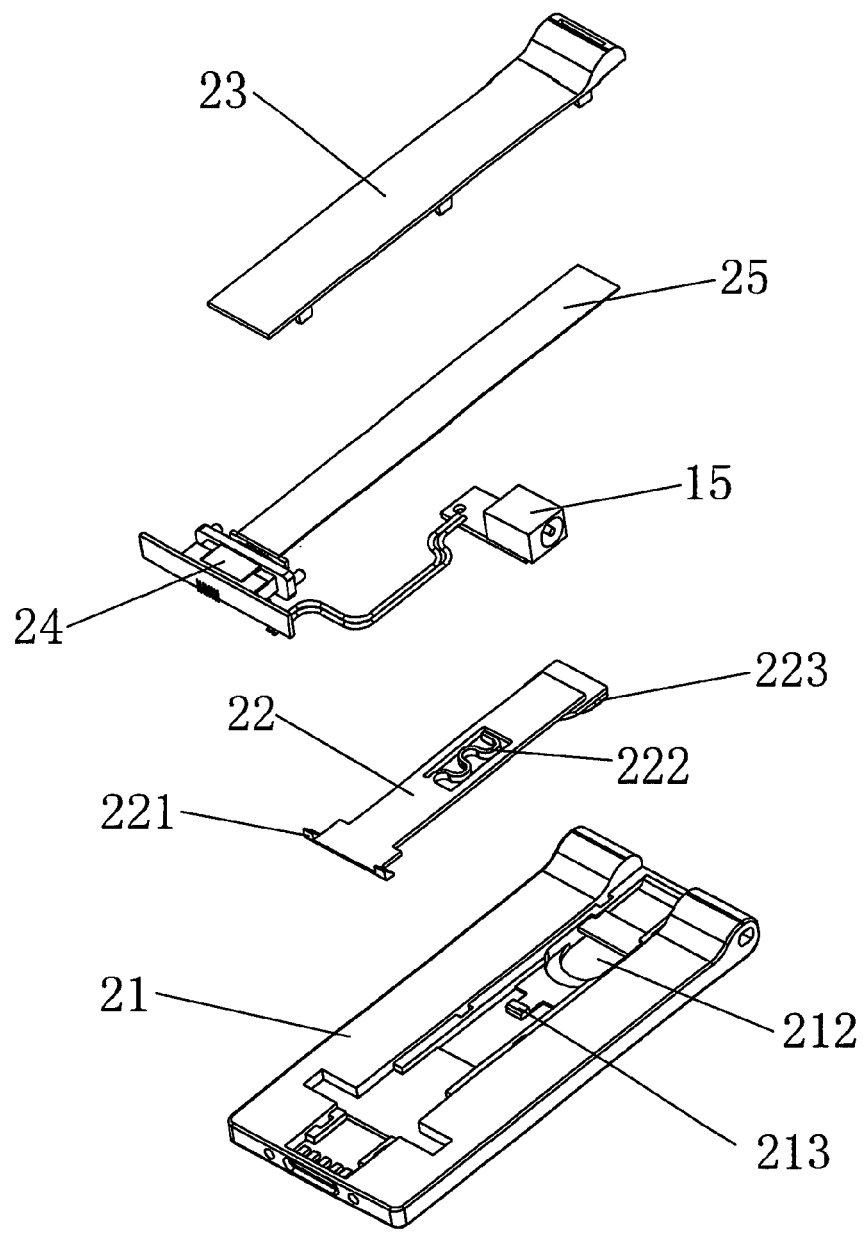
FIG. 4 is an exploded view of supporting plate of the present invention.
Figure 5:
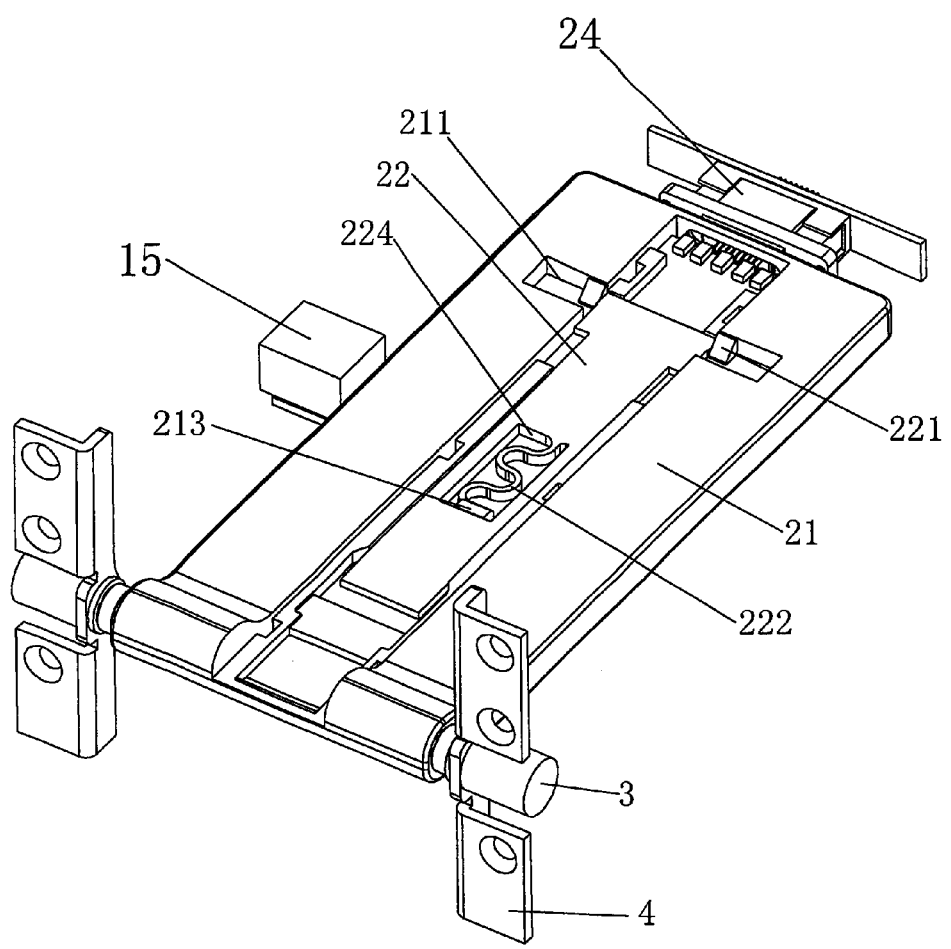
FIG. 5 is a schematic view of the supporting and fixing plates of the present invention, wherein the cover plate and flexible PCB are removed.
Figure 6:
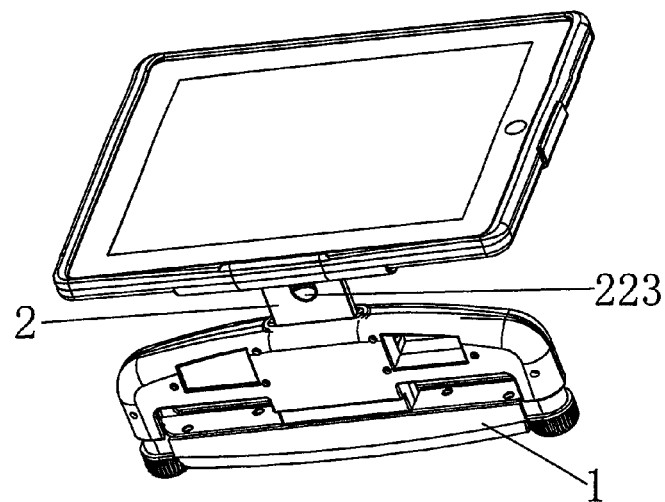
FIG. 6 is a schematic view of the present invention in working condition.
Figure 7:
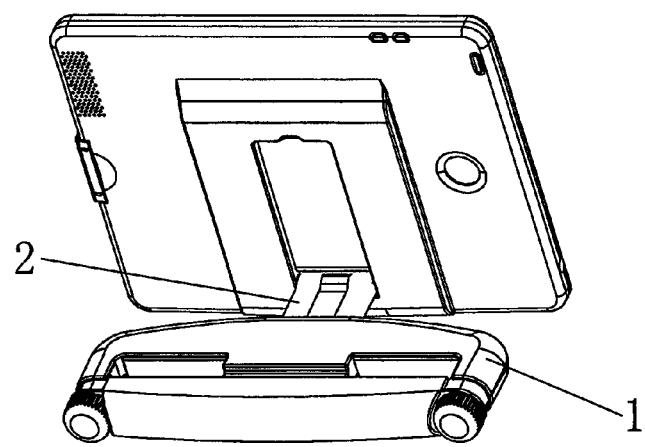
FIG. 7 is a schematic view of the present invention in working condition from another angle.

As shown by FIGS. 1 to 7, the fixing structure for electronics with display screen disclosed by the present invention comprises a base 1, a supporting plate 2 interposed into the base 1, and a fixing plate 4 connected to the supporting plate 2 via a damping shaft 3. To lock the supporting plate 2, within the base 1 two vertically movable (in a direction transverse or perpendicular to the supporting plate 2) jaws 11 with bosses 111 able to clamp the supporting plate 2 are arranged, the supporting plate 2 is provided with grooves 211 matched with the bosses 111. The fixing structure further comprises a slide block 22 movable in a horizontal direction in parallel to the supporting plate 2) able to push the bosses 111 out of the grooves 211.

In order to make the structure more compact and reliable, within the base 1 a upper cover 12 and a lower cover 13 matched with each other 12 are arranged, and coupled to form a cavity for accommodating the supporting plate 2.

In order to lock the supporting plate 2 regardless of the direction the supporting plate 2 is interposed in the base 1 in, the two jaws 11 are arranged in an upper one and a lower one, respectively mounted on the upper cover 12 and the lower cover 13. Accordingly, the upper cover 12 and the lower cover 13 are provided with vertical shafts 14 for mounting and positioning the jaws 11.

In order to make the supporting plate 2 more compact and be matched with the base 1, the supporting plate 2 comprises a baseplate 21 and a corresponding cover plate 23, wherein the baseplate 21 is provided with the grooves 211, and connected with the cover plate 23 by bayonet coupling. The slide block 22 is arranged in the baseplate 21 and movable along the baseplate 21.

In order to allow the slide block 22 to push the bosses 111 out of the grooves 211 successfully, each boss 111 is provided with a two-way inclined plane, the slide block 22 is provided with a inclined step 221, of which inclined plane is oriented towards the bosses 111.

In order to allow the slide block 22 to slide back to the original position, an elastic element 222 (in this case it is a spring) is disposed between the slide block 22 and the baseplate 21 of the supporting plate 2.

In order to make the supporting plate 2 more compact, the slide block 22 is provided with a hollow groove 224, in which the spring 222 is mounted, of which one end is connected with the slide block 22, another end is connected with a projection 213 provided on the baseplate 21.

In order to facilitate the control of the slide block 22, the slide block 22 has a lever 223 on the end thereof, the baseplate 21 has an opening 212 on the surface thereof, and the lever 223 is moveable within the opening 212.

In order to enable rotation angle adjustment for the fixing structure, the damping shaft 3 is a piecewise damping shaft.

In order to extend the application range of the fixing structure, a communication port 24 is disposed on the supporting plate 2 to allow the device fixed to communicate with others, for example, a computer. The fixing structure further comprises a power port 15 disposed on the lower cover 13 for connecting the device to an external power source.

While working, the base 1 may be mounted and locked on a fixed piece in room or car, or placed on a table as a stand, the electronic device with a display screen is fixedly connected to the fixing plate 4, the supporting plate 2 which is connected to the fixing plate 4 via the damping shaft 3 is interposed into the opening of the base 1.

The opening is formed by the upper cover 12 and the lower cover 13 coupled, the upper and lower covers 12 and 13 are provided with square through holes and vertical shafts 14 corresponding to the jaws 11, the jaws 11 are sleeved on the vertical shafts 13 and moveable vertically; through the square holes the bosses 111 of the jaws 11 stick into the grooves 211 of the supporting plate 2 which is interposed into the base 1.

Under an external force applied on the lever 223, the slide block 22 arranged inside the supporting plate 2 is forced to move forwards along the baseplate 21, driving the inclined step 221 to move forwards, by pushing the inclined planes of the bosses 111 to force the jaw 11 to move up along the vertical shaft 14, to let go of the grooves 211, and thus the supporting plate 2 can be released and drawn from the base 1 finally. After the abolition of external manipulation of the lever, the slide block 22 returns to the original position under the action of the elasticity of the spring 222, and as the length of the opening 212 of the supporting plate 2 is specified, the moving range of the slide block 22 is so limited.

As the grooves 211 are provided on one side of the baseplate 21 only (the other side of the baseplate 21 is smooth), and the two jaws are respectively arranged on the two sides of the base 1 (on the upper and lower covers 12 and 13), when the supporting plate 2 is interposed into the base 1, only one jaw 11 can stick in the groove 211 of the supporting plate 2 (another jaw 11 is ineffective), and the inclined step 221 of the slide block 22 only can move the effective jaw 11 as well. When the supporting plate 2 is turned over and interposed into the base 1, another jaw 11 acts to clamp the supporting plate 2, thus the fixation of the supporting plate 2 in the base 1 can be achieved regardless of the orientation of the supporting plate 2.

In order to extend the application range of the fixing structure of the present invention, on the end of the supporting plate 2 a communication port 24 is mounted for connecting the electronic device to an external device, such as a notebook computer, wherein the communication port 24 is connected to the device through a flexible PCB 25. In addition, a power port 15 which is able to connect the device to an external power source is mounted on the lower cover 13 and connected with the communication port 24 via a cable, to allow the electronic device to be charged, speak out, or be used as a host or terminal. It is not only able to achieve the goals of simplifying the way of connection, enhancing the integration of the base 1, and extending the application range, but also able to improve the aesthetics of the products.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims which are to be accorded with the broadest interpretation so as to encompass all such modifications and similar structure.

The invention claimed is:

1. A fixing structure for electronic device with display screen, comprising a base, a supporting plate interposed into said base, a fixing plate connected with said supporting plate via a damping shaft, said base comprising jaws in the interior thereof, said jaws being vertically movable in a direction transverse or perpendicular to said supporting each of said jaws being provided with bosses for locking said supporting plate, said supporting plate being provided with grooves corresponding to said bosses, said fixing structure further comprising a slide block for pushing said bosses out of said grooves, said slide block being horizontally movable in a direction parallel to said supporting plate, an elastic element mounted between said slide block and said supporting plate, wherein said slide block is provided with a hollow groove, in which said elastic element is mounted, one end of said elastic element is connected with said slide block, the other end is connected with a projection on said supporting plate.

2. The fixing structure according to claim 1, wherein said base further comprises an upper cover and a lower cover, coupled to form a cavity for accommodating said supporting plate.

3. The fixing structure according to claim 2, wherein said jaws include an upper jaw and a lower jaw, respectively mounted on said upper cover and said lower cover, accordingly said upper cover and said lower cover are provided with vertical shafts for mounting and positioning said jaws.

4. The fixing structure according to claim 1, wherein said supporting plate comprises a baseplate with said grooves, and a cover plate coupled to said baseplate, said slide block is disposed in and sliding within said baseplate.

5. The fixing structure according to claim 1, wherein each said boss is provided with a two-way inclined plane on the top thereof, accordingly said slide block is provided with inclined steps, of which inclined planes are oriented towards said bosses.

6. The fixing structure according to claim 1, wherein said slide block is further provided with a lever on the end thereof, correspondingly said supporting plate is provided with an opening, said lever is movable within said opening.

7. The fixing structure according to claim 1, wherein said damping shaft is a piecewise damping shaft.

8. The fixing structure according to claim 1, further comprising a communication port on said supporting plate for allowing the electronic device to communicate with other devices, and a power port on the lower cover for connecting the electronic device to an external power source.

* * * * *